May 12, 1964  H. WILCKEN  3,132,380

MACHINE FOR MANUFACTURING SLIDE FASTENER MEMBER

Filed Dec. 14, 1959

INVENTOR
HUGO WILCKEN

BY E. M. Squire

ATTORNEY

United States Patent Office 3,132,380
Patented May 12, 1964

3,132,380
MACHINE FOR MANUFACTURING SLIDE FASTENER MEMBER
Hugo Wilcken, Curau, Kreis Eutin, Holstein, Germany, assignor to Walter Erich Heilmann, Essen-Bredeney, Germany
Filed Dec. 14, 1959, Ser. No. 859,324
Claims priority, application Germany Dec. 15, 1958
1 Claim. (Cl. 18—19)

The present invention relates to a machine for forming helical slide fastener members from a continuous monofilar filament of thermosetting plastic material.

More particularly, the machine of the present invention comprises a heated body member. Two helically threaded spindles with spaced parallel rotational axes are located within the body member. There is a passage of generally elliptical cross-section which extends through the heated body member. Opposite sides of the passage, intermediate its ends, are defined by confronting lateral portions of the spindles. The spindles rotate so that their threads, in the confronting lateral portions, cooperate to draw the helically coiled filament through the passage wherein it is heated to fix the desired pitch, the pitch of the fastener being determined by pitch of the threads on the spindles.

At the input end of the passage, there is a pin of elliptical cross-section. One end of the pin is fixedly supported and the other end is free. The filament is wound around the fixed end of the pin and slides off the tapering free end. The pin is located coaxially with the passage so that the elliptically coiled filament enters the elliptical passage in the same position in which it is wound upon the elliptical pin.

The filament is of circular cross-section. At regularly spaced intervals there are flattened portions which operate as coupling elements and which engage cooperating flattened portions of the opposite helical member in the completed slide fastener. The filament is wound upon the elliptical pin in such a manner that the flattened portions or coupling elements are aligned along one end of the major axis of the elliptical cross-section of the fixed pin. When the filament is engaged by the threads of the spindles, the flattened portions are held in alignment and their positions are fixed by heating during passage through the body of the machine. The threads of the spindles are so positioned or phased relative to each other that the portions of the convolutions of the helical fastener member which contain the flattened coupling element portions of the filament extend perpendicularly with respect to the longitudinal axis of the fastener member whereas the opposite portions are inclined obliquely with respect to the longitudinal axis.

The invention will be more clearly understood from the following specification in conjunction with the accompanying drawing forming a part hereof.

Figure 1:
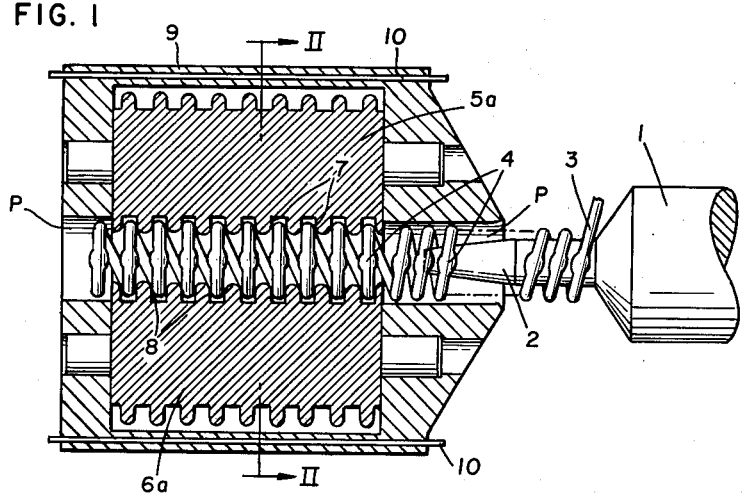
Figure 2:
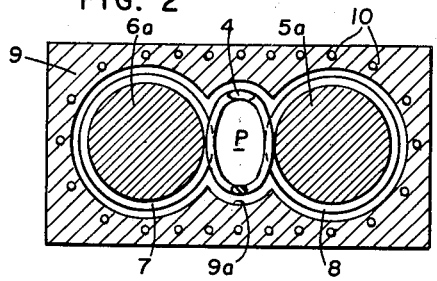
Figure 3:
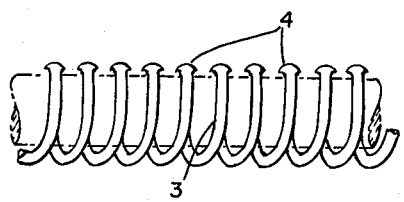
Figure 4:
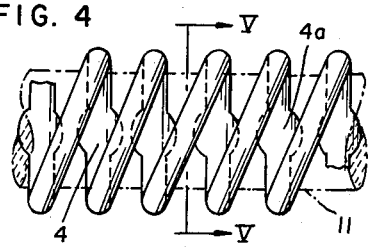
Figure 5:
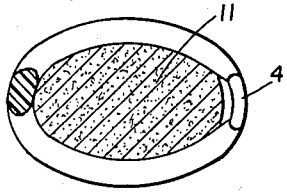
Figure 6:
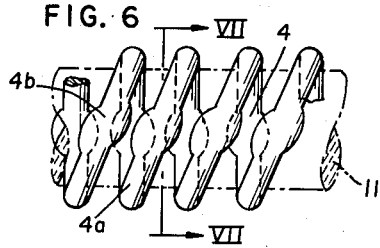

Referring to the drawing:
FIGURE 1 is a plan sectional view through a machine embodying the invention.
FIGURE 2 is a transverse sectional view taken along the line II—II of FIG. 1.
FIGURE 3 is a plan view of a helical fastener member produced by the machine of FIGS. 1 and 2.
FIGURE 4 is a side view of the fastener member of FIG. 3 looking in the direction of the arrow A in FIG. 3.
FIGURE 5 is a transverse sectional view taken along the line V—V of FIG. 4.
FIGURE 6 is a side view similar to FIG. 5 showing a modified form of fastener member produced by the machine of FIGS. 2 and 3 but having two flattened portions in each turn instead of a single flattened portion.

Figure 7:
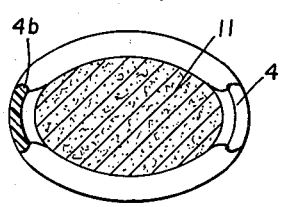

FIGURE 7 is a transverse sectional view taken along the line VII—VII of FIG. 6.

FIG. 1 shows a machine for manufacturing helical filaments of plastic threads of thermosetting materials such as polyamide or the like. A bobbin (not shown) loaded with the thread 3 is rotatably mounted on a stationary shaft 1 which ends in a coiling pin 2. The bobbin is driven in any desired manner, and by means of the rotation of the bobbin, the thread 3 is wound on the stationary pin 2. The polyamide thread 3 may be preformed with stamped coupling elements 4 shown in FIGS. 1-8. The coupling elements 4 may consist of internal flattenings of the thread and are uniformly spaced. They may consist of channelled widenings of the individual turns, a widening of the thread 3 on either side in the longitudinal direction of each turn being obtainable by stamping of the coupling elements 4, as may be seen in particular from FIG. 4. The tightly wound turns slide off automatically from the free end of the conical pin 2 on winding and arrive at two threaded axially parallel and spaced spindles 5 and 6 whose helical pitch corresponds to the pitch of the helical coils or slide fastener members which are to be produced by the machine. The threaded spindles 5 and 6 are disposed in a hollow housing or body member 9. The spindles 5 and 6 are spaced with their axis parallel so that their confronting lateral portions define opposite sides of a generally elliptical passage P intermediate the ends of the passage. Adjacent to the confronting lateral portions of the spindles 5 and 6 which define a part of the passage P, the housing 9 has upper and lower longitudinally extending grooves 9a which are extensions of the upper and lower surfaces of the ends of the passage P. The individual closely disposed longer opposing sides of the flattened turns of the coil are accordingly engaged by the threads of the spindles 5 and 6 and moved in a longitudinal direction whereby the correct or desired pitch of the coil turns is obtained and a forward feed occurs. At the same time heating is produced along the spindles 5 and 6 by means of which the turns of the plastic helical coil turns are fixed in shape.

The coiling pin 2 advantageously possesses an oval or flattened and rounded cross section and the coupling elements 4 are located at the top relative to the plane of the drawing. The two threaded spindles 5 and 6 engage the longer sides of the individual turns, whilst the narrower side including coupling elements 4 and the side opposite thereto are guided correspondingly in grooves 9a.

The helical coil thus obtained may be provided subsequently with a filler cord 11 by wrapping the latter as the filament is wound. It is also possible to feed the filler cord 11 in a longitudinal direction through the pin 2 which may be made hollow for the purpose. It is also possible to form a channel in one side of the pin 2 and to introduce the filler cord in the vicinity of the position where the pin 2 meets the shaft 1.

The device described enables the manufacture of completely uniform helical coils having a constant pitch slope or inclination of turns as shown in FIG. 1. The coupling elements 4 because of the turn pitch, have an inclination towards the longitudinal direction of the helical coils.

The invention further provides that the peripheral parts of each turn where the coupling elements 4 are located, are disposed in alignment parallel to the longitudinal direction or axis of the coil, as may be seen from FIGS. 3, 4 and 6. In order to achieve this, the machine shown in FIGS. 1 and 2, has one of the threaded spindles 5a and 6a displaced relative to the other axially in the longitudinal direction by a length corresponding to half a turn of the helical coil to be manufactured. The thread grooves 7 and 8 are situated at opposite sides of passage P, as seen in FIG. 2. When the turns of the filament or monofilar thread 3 advance from the pin 2 and reach the region of the rotating spindles 5a and 6a, they are engaged by the two opposed longitudinally-extending apex lines of the spindles by the threads of the spindles in such a manner that the upper half of each turn remains stationary in a plane perpendicular to the longitudinal direction whilst the lower half 4a bridges the pitch helically relative to the plane of the drawing. This lower half 4a, as may be seen from FIG. 4, is very steeply inclined towards the longitudinal direction of the helix. The lower half turns 4a intersect the transverse projection of the coil turns. This brings about a better guiding of the side flanges of the slider to be employed, as will be explained. The spindles 5a and 6a, which have the same pitch, rotate in the same direction. They are surrounded by hollow housing 9 in which they are mounted. One end of the spindles is rotated by means of gear wheels or the like (not shown). This housing as may be seen from FIG. 2, has its median internal surfaces 9a formed to serve as a guide for the narrow ends of the coil turns. It is provided with a heating device, for example an inserted electrical heating coil 10 or a steam pipe by means of which the plastic helical turns are heated so that the shape of the turns produced is fixed. Also the coil may be provided with a filler cord 11 in the manner described with respect to FIG. 1.

According to the invention it is possible to provide coupling elements 4 at opposite narrow ends of the turns as shown in FIGS. 6 and 7, with widened parts 4b, whereby the guiding of fastener slide flanges on turn parts 4a is improved.

The invention enables the individual coupling parts 4 to be completely aligned in the longitudinal direction of the helical filaments. A satisfactory firm engagement of two such filaments made into a fastener is thereby obtained. Such a fastener can be inadvertently opened without using the slider, only exerting large forces. By means of the invention it is possible to use for both fastener chains of a sliding clasp fastener, helical coils of the same hand. Thus, it is not necessary to make separately two different helical coils of opposite hand; although the invention does not exclude the manufacture of helical coils of opposite hand.

I claim:

A machine for manufacturing a slide fastener member, comprising a stationary pin for detachably receiving a helical flattened coil of thermosetting plastic filament from a winding bobbin, a body having a generally elliptical passage therethrough, a pair of axially parallel externally threaded rotatable spindles disposed in said body, said spindles being spaced apart to define opposite sides of said passage, said pin being axially aligned with said passage to slip the coil off the pin into the threads of the rotating spindles, the threads of the spindles running in the same direction, the turns of the threads of the two spindles being disposed in opposed pairs in planes perpendicular to the axes of the spindles, and heating means in said body around said spindles, whereby the spindles draw the coil through said passage and said heating means sets the turns of the coil to a fixed spacing with portions of the turns disposed parallel to each other and substantially perpendicular to the axis of the coil, each turn of said coil having a narrow end with a portion of said end spread laterally of the filament on opposite sides thereof in a direction parallel to the axis of the coil, said body being formed with a grooved portion defining a narrow side portion of said passage between opposing sides of the passage to receive the spread portions of the coil turns and guide them in the major diametral plane of said elliptical passage disposed between and parallel to both axes of the spindles while the heating means sets the turns of the coil to said fixed spacing and the spread portions of the coil turns are fixed in coplanar alignment in the axial direction of the coil, and while the spindles draw the coil through said passage.

References Cited in the file of this patent
UNITED STATES PATENTS

| | | |
|---|---|---|
| 1,139,872 | James | May 18, 1915 |
| 1,395,190 | Lamb | Oct. 25, 1921 |
| 2,018,099 | Sundback | Oct. 22, 1935 |
| 2,296,880 | Smith | Sept. 29, 1942 |
| 2,343,747 | Chernack | Mar. 7, 1944 |
| 2,363,826 | Yellin | Nov. 28, 1944 |
| 2,467,227 | Potter | Apr. 12, 1949 |
| 2,545,271 | Gartner | Mar. 13, 1951 |
| 2,740,987 | Moncrieff | Apr. 10, 1956 |
| 2,878,514 | Nichols et al. | Mar. 24, 1959 |
| 2,903,745 | Hansen | Sept. 15, 1959 |
| 2,973,554 | Hansen | Mar. 7, 1961 |